May 27, 1958     D. A. GALONSKA     2,836,075

ONE-WAY BALL NUT

Original Filed June 8, 1949

Inventor
David A. Galonska
L. D. Burch
Attorney

United States Patent Office 2,836,075
Patented May 27, 1958

2,836,075
ONE-WAY BALL NUT

David A. Galonska, Saginaw, Mich., assignor to General Motors Corporation, Detroit, Mich., a corporation of Delaware Original application June 8, 1949, Serial No. 97,895. Divided and this application February 10, 1955, Serial No. 487,400

9 Claims. (Cl. 74—459)

This invention relates to a recirculating ball nut gear and more particularly a one-way ball nut which permits free movement in one direction and retards movement in the other direction. This application is a division of the applicant's co-pending application Serial No. 97,895 filed June 8, 1949 entitled, "Jacks" which has matured into Patent No. 2,716,537.

The recirculating ball-type screw and nut gear is a well-known substitute for the conventional threaded screw and nut gear. The recirculating ball nut gears have matching grooves in both the screw and nut with balls located half in the groove in the screw and half in the groove in the nut. The opposite ends of the passage in the nut are connected by a return passage which guides the balls for continuous recirculation in either direction depending on the direction of the relative rotation of the nut and screw. Since the balls provide rolling friction between the screw and the nut in place of the sliding friction in the ordinary screw and nut, the friction between the screw and nut of the ball nut gear is greatly reduced. Though frictionless operation is highly desirable in many applications, there are certain applications where it is impossible to use a ball nut which provides frictionless drive in both directions. Certain applications where there is a continuous load on the nut as there would be in a jack of the type disclosed in the above Patent No. 2,716,-537, require some mechanism to limit or retard the movement of the nut in one direction under load. In this ball nut gear the low friction characteristics of the ball nut are retained for movement in one direction by providing a tangential return passage portion at one end of the helical groove in the ball nut. This permits the balls to freely circulate in the groove between the nut and screw and to freely enter the tangential passage portion for recirculation to the other end of the nut. At the other end of the ball nut the passage portion adjacent the groove helix meets the helical groove substantially at right angles. The balls are thus retarded or completely stopped in their circulating movement from the groove in the nut to the return passage. Since the circulation of the balls is stopped or retarded, the ball nut does not have the low friction characteristics produced by the circulation of the balls and movement of the ball nut gear requiring circulation of the balls in this direction is not frictionless.

An object of the invention is to provide a one-way circulating ball nut having a recirculating return passage located so that the nut will have friction-free movement in one direction and friction retarded movement in the other direction.

Another object of the invention is to provide in a ball nut having a helical passage between the screw and the nut, a return passage connected to the helical passage at one end of the nut to permit free movement in the return passage and connected to helical passage at the other end of the nut to retard or stop the movement of the balls into the return passage.

Another object of the invention is to provide in a recirculating ball nut gear having circulating balls located in helical grooves in the screw and the nut, a return passage which is connected substantially tangentially at one end of the ball nut and substantially radially at the other end of the ball nut.

These and other objects of the invention will be more apparent from the following drawing and description of the preferred embodiment of the invention.

Figure 1:
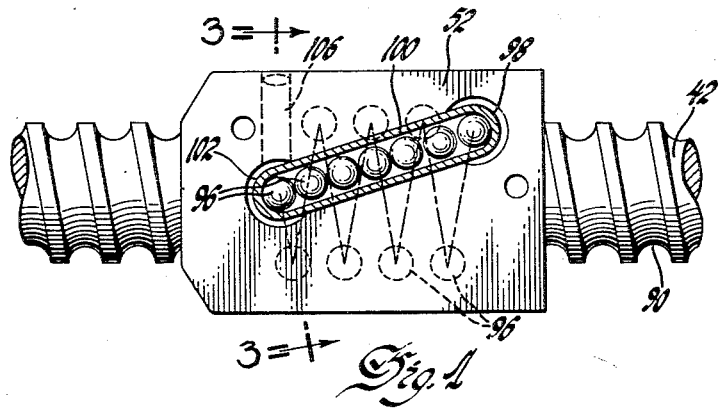
Figure 1 is a partial plan of the ball nut and screw assembly with parts in section.

The one-way ball nut 52 illustrated in detail in the drawing is particularly adapted for a device where the load always acts in one direction such as a lifting jack. This ball nut may be used with the lifting jack of Patent No. 2,716,537. The screw 42 has rounded thread 90, while the nut 52 has an internal bore 92 with rounded internal thread 94 of the same pitch as thread 90. The matching threads provide a helical passage of circular cross section for the balls 96 between the screw and the nut. Adjacent each end of this passage a transfer passage portion is provided in the nut 52. At one end the bore 98 enters the ball passage tangentially to provide the least resistance to the circulation of the balls. The transfer tube 100 has a leg extending into bore 98. The end of this leg projects into the ball passage sufficiently to deflect the balls into the transfer tube in the conventional manner. At the other end of the ball passage a bore 102 located centrally of one side of the nut extends radially to the thread as clearly shown in Figure 3. The transfer tube 100 has a leg 104 extending into this bore.

Figures 3, 4:
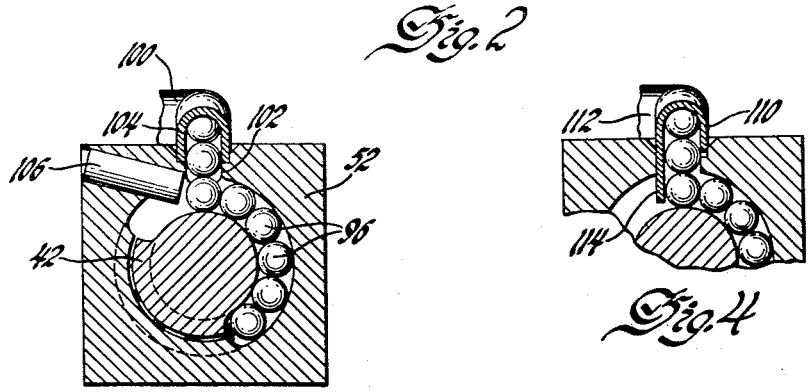
Figure 3 is a section on the line 3—3 of Figure 1.
Figure 4 is a partial sectional view similar to Figure 3 of a modification.

The balls are guided into the leg end 104 of transfer tube 100 by a stop 106 secured in a bore in the nut 52 by suitable means, such as a press fit, set screws, threads, etc. A modified form of stop is shown in Figure 4 in which one side of the leg 110 of a similar transfer tube 112 is extended at 114 into the ball passage to provide a radial stop or abutment for the balls. It will be noted that the stop 106 will allow the balls to pass slightly beyond the center line of the radical portion of the transfer tube. Thus the balls will positively lock and no circulation will occur in the direction in which the balls leave the helical groove at this point. In the modification the abutment 114 is parallel to the center line of the passage. In this form the frictional forces are generally sufficient to substantially or completely retard the circulation of the balls. If the abutment is bent toward the approaching balls to provide a short abutment portion more nearly tangent to the screw the frictional retarding forces will be less than the balls will partially circulate.

Figure 2:
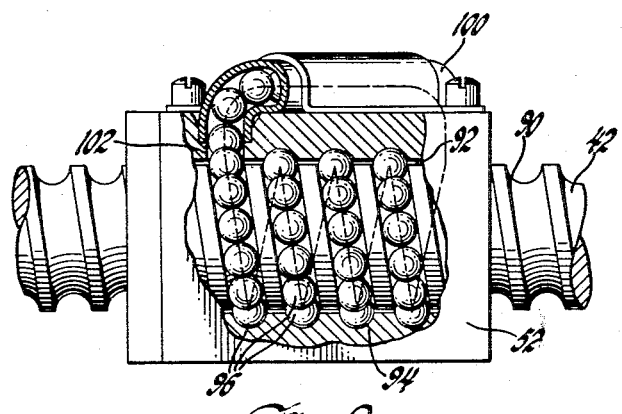
Figure 2 is a partial elevation of the ball nut and screw assembly with parts in section.

When the screw 42 rotates in a direction to move to the left as viewed in Figure 2, the balls move toward the stop 106 which permits the balls to move a small distance past the radial return passage portion 104. Thus the ball engaging the stop is locked in the helical race and the entrance to the return passage is blocked to prevent circulation of the balls in the helical race and return passage. When the screw is rotated in the opposite direction, the balls enter the helical race through radial passage portion 104 and freely enter the helical race and freely leave the helical race at the tangential section 98 of the return passage. The balls may be stopped or retarded by employing a radial return passage portion 114 as shown in Figure 4 or by inclining the radial passage portion toward a tangential position to provide less resistance to the circulation of the balls.

When a threaded screw and nut gear is employed on a scissors jack the friction in the gear holds the load in elevated position. However, when a ball nut is employed the friction in the ball nut gear is not sufficient to hold the load elevated and in a jack where the screw is rotatable the load force will rotate the screw to lower the load. When my ball nut is employed in a jack and the screw is rotated to raise or move the load the balls circulate with a minimum of friction since they enter the helical passage through the radial bore 102 and leave through the tangential bore 98. However, when the load is lowered the balls either do not circulate or are retarded in their circulation since they enter the helical path in the nut through the tangential bore 98 but must leave through the radial bore 102. This increased friction between the screw and ball nut, when it is rotated or tends to rotate to lower the load, holds the load in position but allows the load to be lowered with a minimum of effort applied to the screw.

The above described embodiments of the device illustrate the invention. Other modifications will be apparent to those versed in this field within the scope of the appended claims.

The claims:

1. A ball nut, passage means having a helical and a return portion for the circulation of the balls, balls in said passage, means in said passage to transfer the balls from the one portion to the other portion of said passage means including means at the point between said passage portions to retard the circulation of the balls in said helical passage portion.

2. A ball nut having a helical ball passage, a transfer passage connecting the ends of said helical ball passage, said transfer passage being connected to said passage substantially tangentially to the helical passage at one end, said transfer passage being connected substantially radially to the helical passage at the other end.

3. A ball nut having a helical ball passage, a transfer passage connecting the ends of said helical ball passage, said transfer passage being connected to said passage substantially tangentially to the helical passage at one end, said transfer passage being connected substantially radially to the helical passage at the other end and stop means in said helical ball passage allowing the balls to move beyond said radial passage to prevent circulation of the balls outwardly through the radial passage.

4. In a ball nut, a helical passage for the circulation of balls, a transfer passage connecting the junction points at the ends of said helical passage, balls in said helical passage and transfer passage, one junction point having means to provide substantially friction-free transfer movement of the balls between said helical passage and transfer passage for both directions of ball circulation, and the other junction point having means to retard the movement of the balls in one direction between said helical passage and said transfer passage for frictional movement of said balls in said helical path and to provide friction-free movement in the other direction of ball circulation during transfer between said helical passage and transfer passage for friction-free rolling movement of said balls in said helical passage.

5. In a ball nut, a helical passage for the circulation of balls, a transfer passage connecting the ends of said helical passage, said transfer passage being connected to said helical passage and having the portion which first engages the balls to transfer them from the helical passage to the transfer passage located substantially tangentially to the helical passage at one end, said transfer passage being connected to said helical passage and having the portion which first engages the balls to transfer them from the helical passage to the transfer passage located substantially radially to the helical passage at the other end to retard movement of the balls in one direction.

6. In a ball nut, a helical passage for the circulation of balls, a transfer passage connecting the ends of said helical passage, said transfer passage being connected to said helical passage and having the portion which first engages the balls to transfer them from the helical passage to the transfer passage inclined to the helical passage at one end for unrestricted ball circulation in both directions, said transfer passage being connected to said helical passage and having the portion which first engages the balls to transfer them from the helical passage to the transfer passage being more steeply inclined to the helical passage than the same portion at the other end of the helical passage to restrict the ball circulation in one direction.

7. In a ball nut, a helical passage for the circulation of balls, a transfer passage connecting the ends of said helical passage, said transfer passage being connected to said helical passage at one end and having the portion which first engages the balls to transfer them from the helical passage to the transfer passage inclined to the helical passage at one end for unrestricted ball circulation in both directions, said transfer passage being connected to said helical passage at the other end and having the portion which first engages the balls to transfer them from the helical passage to the transfer passage located substantially radially to the helical passage at the other end for restricted ball circulation in one direction.

8. In a ball nut and screw device, a ball nut having threads having a finite length, said ball nut cooperating with a screw having threads of greater length to provide a helical passage portion having a length equal to the finite length of said threads in said ball nut, a return passage portion connecting the ends of said helical passage, balls in the passage formed by said helical and return passage portions circulating through said passage during relative movement of said ball nut and screw, said return passage portion including means to transfer the balls between said helical and return passage portions and said passage having means including a substantially right angle bend located so that movement of the balls in one direction is blocked and movement in the other direction is permitted during relative rotation of the ball nut and screw.

9. A ball nut according to claim 1 and said means in said passage to transfer the balls from the one portion to the other portion of said passage means including means at the point between said passage portion to retard the circulation of the balls in said helical passage portion in one direction and to permit free movement in the other direction.

References Cited in the file of this patent

UNITED STATES PATENTS

| 676,044 | Locke | June 11, 1901 |
| 1,272,589 | Whitney | July 16, 1918 |
| 1,831,080 | Schmidt | Nov. 10, 1931 |
| 2,444,886 | Vickers | July 6, 1948 |
| 2,505,131 | Means | Apr. 25, 1950 |

FOREIGN PATENTS

| 769,129 | France | June 5, 1934 |